United States Patent [19]

Quinn

[11] 3,772,586

[45] Nov. 13, 1973

[54] FIRING CIRCUIT AND TRANSFORMER

[75] Inventor: Frederic R. Quinn, Red Hook, N.Y.

[73] Assignee: Zyrotron Industries, Inc., South Hackensack, N.J.

[22] Filed: Oct. 12, 1972

[21] Appl. No.: 296,887

[52] U.S. Cl. ............... 323/35, 307/133, 307/252 P, 307/252 UA, 323/50, 323/75 E, 323/85

[51] Int. Cl. ........................................... H03k 17/66

[58] Field of Search .................. 307/252 P, 252 UA, 307/133; 323/48, 49, 50, 75 E, 85, 88, 34–37

[56] References Cited

UNITED STATES PATENTS

| | | | |
|---|---|---|---|
| 2,686,291 | 8/1954 | Macklem | 323/88 X |
| 3,295,053 | 12/1966 | Perrins | 323/50 X |
| 3,675,111 | 7/1972 | Sakka et al. | 302/252 P |

*Primary Examiner*—Gerald Goldberg
*Attorney*—Irving Seidman et al.

[57] ABSTRACT

The firing circuit is adapted to be utilized with a silicon controlled rectifier bridge circuit and includes a transformer having a central leg bracketed by respective outer legs. The primary and a pair of secondary windings are wound on the central leg. The primary winding is adapted to be connected with a source of potenial and each secondary winding is adapted to be connected between the cathode and gate electrodes of respective silicon controlled rectifiers in the bridge circuit. The reluctance path in at least one of the outer legs is increased whereby one silicon controlled rectifier is gated on at substantially the same time the other silicon controlled rectifier is turned off.

19 Claims, 4 Drawing Figures

FIRING CIRCUIT AND TRANSFORMER

This invention relates generally to a firing circuit for a silicon controlled rectifier controlled circuit and, more particularly, pertains to a firing circuit which gates a silicon controlled rectifier at substantially zero cross-over of an AC waveform.

In many bridge circuits using silicon controlled rectifiers, a problem is encountered particularly when the firing potential increases slowly as when the firing circuit includes a thermal sensing element or the like. For example, FIG. 3 of U.S. Pat. No. 3,451,217 illustrates the type of bridge or control circuit under consideration. It has been found that when the potential applied to the primary winding is slowly increased, a delay is encountered before the silicon controlled rectifiers fire. As a result, energy is lost in the silicon controlled rectifiers thereby decreasing the overall efficiency of the system and requiring greater capacity silicon controlled rectifiers.

In addition, in order to insure each silicon controlled rectifier carries a balanced load, the silicon controlled rectifiers must be carefully hand-picked so that they have identical characteristics. This in and of itself is a time consuming and costly operation.

Accordingly, an object of the present invention is to provide a firing circuit for silicon controlled rectifiers which is efficient in operation.

A more specific object of this invention is the provision of a firing circuit which causes silicon controlled rectifiers in a bridge circuit to fire substantially at zero cross-over of the applied waveform.

Another object of the present invention resides in the novel details of construction which provide a firing circuit of the type described which is economical to manufacture and requires a minimum volume of space.

Accordingly, a firing circuit constructed in accordance with the present invention comprises a transformer having a frame comprising at least a center leg and an outer leg on each side of the center leg. A primary and a pair of secondary windings are provided on the frame and leads are adapted to connect the primary winding with a source of potential. Additionally, a lead is adapted to connect one of the pair of secondary windings between the cathode and gate electrodes of a silicon controlled rectifier in a bridge circuit and another lead is adapted to connect the other of the pair of secondary windings between the cathode and gate electrodes of another silicon controlled rectifier in the bridge circuit. Reluctance means is provided for increasing the reluctance in a path which includes at least one of the legs whereby, in operation, the silicon controlled rectifiers are turned on substantially at zero cross-over of the applied waveform.

Other features and advantages of the present invention will become more apparent from a consideration of the following detailed description when taken in conjunction with the accompanying drawing, in which.

Figure 1:
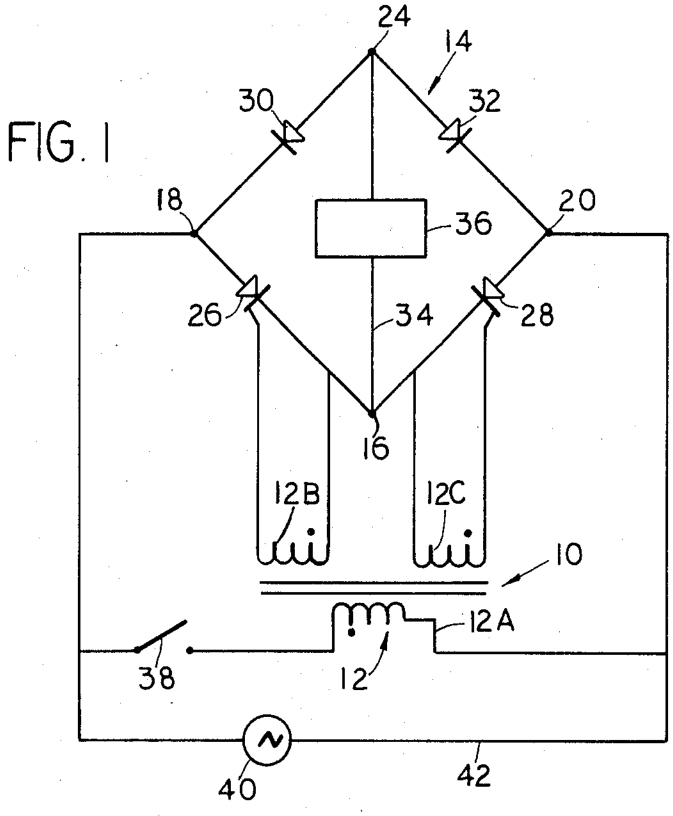
FIG. 1 is a schematic circuit wiring diagram of the silicon controlled rectifier control circuit and a firing circuit constructed according to the present invention.

A firing circuit constructed according to the present invention is illustrated schematically in FIG. 1 and designated generally by the reference numeral 12 and includes a transformer 12. The firing circuit 10 is adapted to be utilized in conjunction with a silicon controlled rectifier bridge circuit designated generally by the reference numeral 14 in FIG. 1 and shown more specifically in the aforementioned patent.

More specifically, the control circuit 14 includes a bridge having respective junctions 16, 18, 20 and 24. Connected between the junctions 16 and 18 is a first silicon controlled rectifier 26. The cathode electrode of the rectifier 26 is connected to the junction 16 and the anode electrode is connected to the junction 18. Similarly, a second silicon controlled rectifier 28 is connected between the junctions 16 and 20. The cathode electrode of the rectifier 28 is connected to the junction 16 and the anode electrode is connected to the junction 20. Connected between the junctions 18 and 24 is a first diode 30. The diode is polarized to conduct current from the junction 24 to the junction 18. In a similar manner, a second diode 32 is connected between the junctions 24 and 20. The diode 32 is polarized to conduct current from the junction 24 to the junction 20. Connected between the junctions 16 and 24 by a lead 34 may be a load 36 or the like which provides a path for current flow from the junction 16 to the junction 24. Additionally a source of alternating current potential 40 is connected by a lead 42 between the junctions 18 and 20. Additionally, The transformer 12 includes a primary winding 12A which is connected across the source of potential 40 through a single-pole single-throw switch 38. The transformer 12 further includes a secondary winding 12B which is connected between the gate and cathode electrodes of the silicon controlled rectifier 26. Another secondary winding 12C is connected between the gate and cathode electrodes of the silicon controlled rectifier 28. As shown in FIG. 1, the secondary windings 12B and 12C are polarized to gate the respective silicon controlled rectifier into conduction on alternate half-cycles of the input AC waveform so that the bridge remains continuously conductive as long as the switch 38 remains closed.

To be more specific, in operation, when it is desired, for example, to supply current to the load 36, the switch 38 is closed. Alternating current will then flow through the primary winding 12A of the transformer 12. Depending upon the polarity of the waveform at the instant the switch 38 is closed, either silicon controlled rectifier 26 or 28 will be gated into conduction. If it is assumed that silicon controlled rectifier 26 initially conducts current, a current will flow from the source 40 through the circuit comprising silicon controlled rectifier 26 to the junction 16, through the load 36 to the junction 24, through the diode 32 to the junction 20 and back to the source of potential 40. On the other hand, when silicon controlled rectifier 28 conducts, current will flow from the source 40 to the junction 20 and from the said junction through the silicon controlled rectifier 28 to the junction 16. Thus, current will again flow through the load 36 to the junction 24 and through the diode 30 to the junction 18 back to the source of potential 40.

However, as noted hereinabove, if the potential applied to the primary winding 12A of the transformer 12 is slowly increased, a dealy is encountered in firing the silicon controlled rectifiers. That is, assuming that the switch 38 is replaced by a thermal sensing element or the like thereby causing the potential applied to the transformer winding 12A to increase slowly as the resistance of the thermal element decreases in response to the sensed environment, the silicon controlled rectifiers will not fire at zero cross-over of the applied AC waveform. This action produces many disadvantages foremost among which is the fact that energy will be dissipated in the silicon controlled rectifiers rather than being applied to the load thereby decreasing the overall efficiency of the circuit. Additionally, this action requires careful selection of the silcon controlled rectifiers so that they have identical characteristics otherwise the rectifiers will carry unbalanced current loads which may cause the rectifiers to become damaged.

In accordance with the present invention, a transformer for the firing circuit is provided which controls the operation of the silicon controlled rectifiers which causes the rectifiers to fire substantially at zero crossover of the applied waveform regardless of whether the applied potential is slowly increased.

Additionally, the silicon controlled rectifiers need not have identical characteristics in order to fire at substantially the zero cross-over point when the transformer of the present invention is utilized in the firing circuit.

Figure 2:
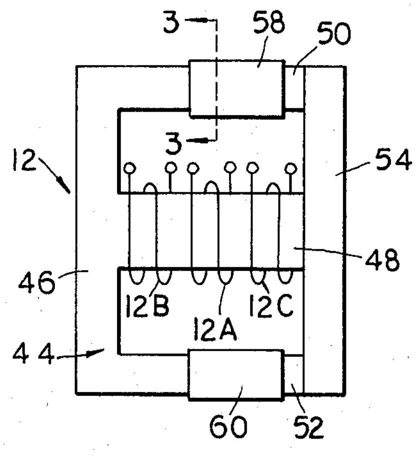
FIG. 2 is a front elevational view of the transformer portion of the firing circuit, partially in schematic form.
Figure 3:
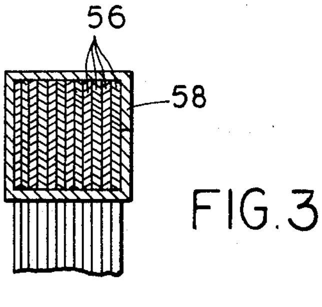
FIG. 3 is a sectional view thereof taken along the line 3—3 of FIG. 2.

One embodiment of the transformer 12 constructed according to the present invention is shown in FIGS. 2 and 3 and comprises a frame 44. The frame 44 includes a so-called E section 46 having a center leg 48 and outer legs 50 and 52. The legs 48, 50 and 52 are connected together by an I section 54 which provides a return path for the magnetic flux. The frame 44 is comprised of laminated layers 56 (FIG. 3) of ferromagnetic material. As shown schematically in FIG. 2, the transformer windings 12A, 12B and 12C are wound about the center or central leg 48 of the transformer.

Surrounding a portion of the leg 50 of the transformer 12 is a shorting ring designated generally by the reference numeral 58. The shorting ring 58 increases the reluctance in the path which includes the leg 50 of the transformer. In a similar manner, a shorting ring 60 is provided around the leg 52 of the transformer thereby increasing the reluctance in the path which includes the leg 52.

The exact theory of operation of the transformer 12 in the firing circuit 10 is not clearly understood. However, oscilloscope patterns of the circuit shown in FIG. 1 illustrate that use of the transformer 12 shown in FIG. 2 which includes the shorting rings 58 and 60 cause the silicon controlled rectifiers 26 and 28 to fire substantially at zero cross-over of the applied AC waveform. However, if the rings 58 and 60 are removed from the transformer, a noticeable time delay is observed before the silicon controlled rectifiers fire. One possible explanation for this phenomenon may be due to the fact that the shorting rings produce what may be considered a back emf similar to armature reaction. Additionally, when a silicon controlled rectifier is turned off, a reverse current flow of relatively high magnitude is produced. Accordingly, it is believed that the reverse current flow of the silicon controlled rectifier which is turning off together with the back emf produced by the shorting rings (or the increase in reluctance in the path of the magnetic flux) is sufficient to cause the other silicon controlled rectifier to turn on substantially at zero cross-over of the AC waveform. Although the above explanation is advanced as one possible reason for the operation of the firing circuit of the present invention, it is emphasized that this explanation is theoretical only and the actual phenomenon may be quite different than the theory advanced. Accordingly, the present invention is in no way to be limited by the above explanation.

Additionally, it is to be noted that the transformer 12 shown in FIGS. 2 and 3 will also operate with only one shorting ring either 58 or 60; however, the operation is not as efficient as with the two shorting rings.

In an actual construction, the overall length of the transformer frame including the I section 54 was 0.62 inches. The leg 48 was 0.036 square inches in area and each of the legs 50 and 52 was 0.018 square inches in area. The length of the shorting ring was 0.250 inches. Additionally, the shorting rings 58 and 60 were fabricated from a relatively good conductor of current such as copper.

Figure 4:
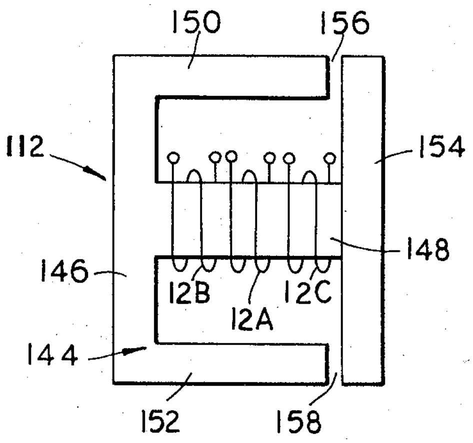
FIG. 4 is a front elevational view of a modified embodiment of the transformer portion of the firing circuit.

FIG. 4 illustrates a modified embodiment of a transformer utilized in the firing circuit of the present invention. The transformer of FIG. 4, which is designated generally by the reference numberal 112, is similar in construction to the transformer 12 shown in FIGS. 2 and 3 and includes a frame 144 having an E-section 146 and an I-section 154. The E-section 146 is provided with a central leg 148 and outer legs 150 and 152. The windings 12A – 12C are received on the center leg 148. Air gaps 156 and 158 are provided in the respective legs 150 and 152. The air gaps substantially increase the reluctance of the path which includes the legs 150 and 152 and therefore decrease the amount of flux in these legs due to the primary winding in the same manner as the shorting rings 58 and 60 decrease the flux in the legs 50 and 52 of the transformer 12. It has been found that the provision of the air gaps 156 and 158 produce a similar result when the transformer 112 is used in the firing circuit 10 as does the transformer 12. That is, the transformer 112 similarly cuases the silicon controlled rectifiers to turn on at substantially zero cross-over of the applied AC waveform. It has also been found that a single air gap provided in either the leg 150 or the leg 152 will produce substantially the same result. However, the overall efficiency of the circuit is less than when a double air gap is provided as shown in FIG. 4. Additionally, it has been found that the shorting ring construction of FIGS. 2 and 3 is more efficient than the construction of FIG. 4.

In actual embodiments, the transformer 112 of FIG. 4 was provided with an air gap which ranged between 0.5 to 6 mils in length.

Accordingly, a firing circuit including a novel transformer for use in conjunction with a bridge circuit incorporating silicon controlled rectifiers has been described which substantially increases the efficiency of the bridge circuit.

While preferred embodiments of the invention have been shown and described herein, it will be obvious that numerous omissions, changes and additions may be made in such embodiments without departing from the spirit and scope of the present invention.

What is claimed is:

1. A firing circuit for a control circuit of the type having first and second silicon controlled rectifiers each having an anode, a cathode and a gate electrode; a first, second, third and fourth junction; a lead connecting one of said anode or cathode electrodes of said first and second silicon controlled rectifiers to said first junction; leads connecting the other electrode of said first and second silicon controlled rectifiers to said second and third junctions, respectively; a first diode connected between said second and fourth junctions and a second diode connected between said third and fourth junctions; path means connecting said first and fourth junctions for providing a path for current flow therebetween, and leads adapted to connect a source of potential between said second and third junctions, said first and second diodes being polarized whereby current flows from said third junction through said second silicon controlled rectifier and said first diode to said second junction or from said second junction through said first silicon controlled rectifier and said second diode to said third junction; said second and third junctions being adapted to be connected across a source of alternating current potential; said firing circuit comprising a transformer having a respective outer leg on each side of an inner leg, a primary winding and a pair of secondary windings on said inner leg, means for selectively connecting said primary winding to a source of alternating current, a lead connecting one of said pair of secondary windings between the gate and cathode electrodes of said first silicon controlled rectifier, a lead connecting the other of said pair of secondary windings between the gate and cathode electrodes of said second silicon controlled rectifier, and reluctance means for increasing the reluctance in a path which includes at least one of said outer legs of said transformer.

2. A firing circuit as in claim 1, wherein said reluctance means comprises an air gap in said one leg.

3. A firing circuit as in claim 2, in which said air gap is in the range of 0.5 to 6 mils in length.

4. A firing circuit as in claim 1, in which said reluctance means comprises a shorting ring surrounding said one leg.

5. A firing circuit as in claim 4, in which said shorting ring is fabricated from copper.

6. A firing circuit as in claim 4, in which the area of said one leg is substantially 0.018 square inches and said shorting ring has a length of substantially 0.250 inches.

7. A firing circuit as in claim 1, in which said reluctance means is operable to increase the reluctance in a path which further includes said other of said outer legs.

8. A firing circuit as in claim 7, in which said reluctance means comprises respective air gaps in each of said outer legs.

9. A firing circuit as in claim 7, in which said reluctance means comprises respective shorting rings on each one of said outer legs.

10. A firing circuit as in claim 9, wherein said shorting rings are fabricated from copper and surround said respective outer legs.

11. A transformer for a silicon controlled rectifier firing circuit comprising a transformer having a frame comprising at least a center leg and an outer leg on each side of said center leg, a primary and a pair of secondary windings on said frame, a lead adapted to connect said primary winding with a source of potential, a lead adapted to connect one of said pair of secondary windings between the cathode and gate electrodes of a silicon controlled rectifier, a lead adapted to connect the other of said pair of secondary windings between the cathode and gate electrodes of another silicon controlled rectifier, and reluctance means for increasing the reluctance in a path including at least one of said legs.

12. A transformer as in claim 11, in which said reluctance means is provided in at least one of said outer legs.

13. A transformer as in claim 11, in which said primary and pair of secondary windings are wound on said center leg.

14. A transformer as in claim 13, in which said reluctance means is provided in at least one of said outer legs.

15. A transformer as in claim 14, in which said reluctance means comprises an air gap.

16. A transformer as in claim 14, in which said reluctance means comprises a shorting ring on said one leg.

17. A transformer as in claim 13, in which said reluctance means is provided in each one of said outer legs.

18. A transformer as in claim 17, in which said reluctance means comprise respective air gaps in each one of said outer legs.

19. A transformer as in claim 17, in which said reluctance means comprises respective shorting means on each one of said outer legs.

* * * * *